PER ANDERSON & ERIK E:SON ODELSTIERNA.
REDUCTION OF ORES BY MEANS OF PEAT.
APPLICATION FILED APR. 18, 1912.
1,105,870.
Patented Aug. 4, 1914.
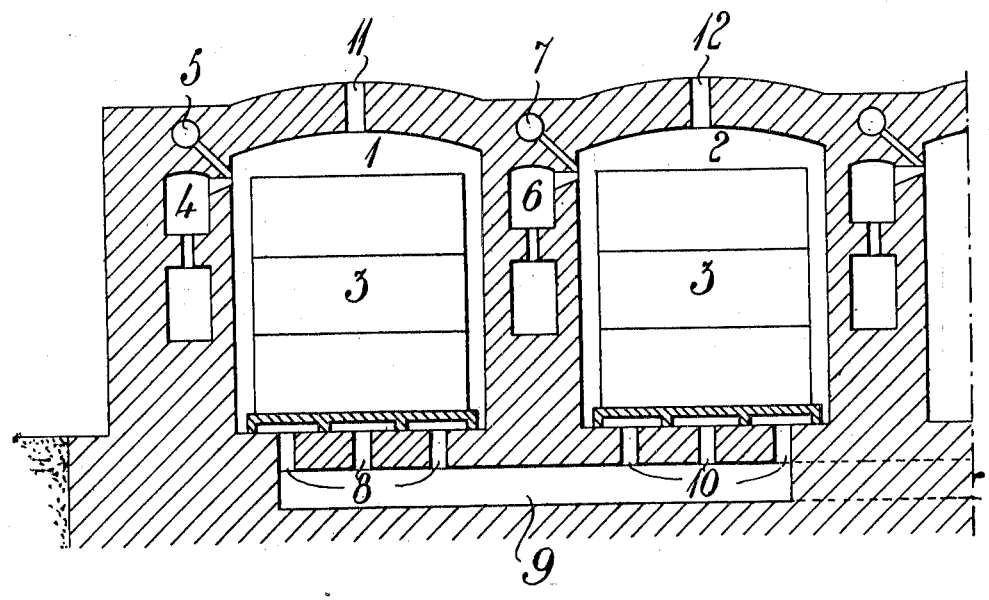

UNITED STATES PATENT OFFICE.

PER ANDERSON, OF ARVIKA, AND ERIK E: son ODELSTIERNA, OF STOCKSUND, SWEDEN.

REDUCTION OF ORES BY MEANS OF PEAT.

1,105,870.	Specification of Letters Patent.	Patented Aug. 4, 1914.

Application filed April 18, 1912. Serial No. 691,703.

*To all whom it may concern:*

Be it known that we, PER ANDERSON and ERIK E: SON ODELSTIERNA, subjects of the King of Sweden, residing at Kyrkogatan 146, Arvika, Sweden, and Villa Pyrola, Stocksound, Sweden, have invented new and useful Improvements in and Relating to the Reduction of Ores by Means of Peat, of which the following is a specification.

It has been tried since long time to use peat as a reduction substance and as fuel in producing iron in shaft furnaces. This, however, has hitherto been impossible on account of the tendency of the peat to become powdered during its passage down through the furnace shaft and to obstruct the passage for the gases formed in and rising from the reduction and smelting zone. For increasing the strength of the peat it has been proposed to form the same into bricks with or without the addition of binding substances, but even the said bricks have been disintegrated, this circumstance probably depending on the violent formation of gas which takes place when the bricks are subjected to high heat. The peat bricks, moreover, are expensive in their production and are thus generally not capable to form a sufficiently cheap substitute for cokes or charcoal.

For making it possible to employ the cheap, porous and powdered peat in the production of iron we therefore use a method in which the said condition of the peat facilitates the reduction process instead of counteracting it. A method of this kind is the sponge-iron process.

In employing such a light and voluminous reduction material as peat in the direct production of iron, several inconveniences, however occur which must be surmounted in order to make the process economically practicable. One of the greatest of the said inconveniences has been that the charge of ore and reducing substances fills up a large space. To surmount this inconvenience the following method has proved to be very efficient:—The finely disintegrated ore is intimately mixed with a quantity of finely disintegrated peat which is sufficient for reducing the ore. The reason why such an intimate mixture takes less place than the peat powder and the ore placed side by side in more or less large quantities or pieces, is that in the intimate mixture, the grains of ore will occupy the small empty spaces between the unmoldered fiber substance and the moldered peat substance. From this reason it is obvious that the intimate mixture is of a considerable importance for the question of space and for making it possible to use a voluminous, low quality reducing substance such as peat. Another inconvenience of the peat is its low heat conductivity which makes it difficult to cause the heat required for the reduction to penetrate to the center of the charge. This inconvenience is also surmounted by the intimate mixture used, as the heat conductivity of the mixture is increased just as the mixture is made more intimate.

The intimate mixing of the ore and the reducing substance has still another important advantage. As known, the final reduction of the iron ore, *i. e.* the converting of the ferrous oxid into iron, is a process which is very difficult to accomplish with a gaseous reducing agent. The presence of solid carbon, on the contrary, essentially facilitates the said process, whereby the duration of the same is diminished and the temperature may be kept lower. An increase of the number of contact points between the ore and the reducing agent, *i. e.* a more intimate mixture, will also considerably facilitate the reduction, which is of considerable importance in the use of peat as a reducing agent, because hereby the increased speed of production counteracts the inconvenience of the great volume of the peat. As the heat conductivity of the peat is considerably lower than that of the ore, it is necessary for making a method based upon this reducing substance economically practicable to heat very uniformly the portion of the receptacles which contain the intimate mixture. This is accomplished by burning gases with air around the receptacles. As mentioned above, it is desirable to make the volume of the charge as small as possible. The water mechanically contained in the peat therefore must be removed as completely as possible, only a few per cent. of water in the peat being liable to cause its fibers and moldered substance to swell.

On account of the low heat conductivity of the pulverized peat it will be very expensive to perform a satisfactory drying or carbonization of the same according to hitherto known methods in furnaces or heaps. The present invention therefore also comprises a method which makes it possible to eliminate the influence of the low heat conductivity of the peat in carbonizing or drying the same.

As known, ore concentrates generally contain about 6-8% water. When these moistened concentrates are mixed with dry peat, the latter absorbs the water and its volume is increased. For preventing this, the moisture of the ore should be removed, which preferably can be done by roasting, the ore then being also oxidized and the main portion of its sulfur removed. As the ore also has to be mixed intimately with the pulverized peat before it is inclosed in the reduction receptacles our process is carried on in such manner that the ore is mixed with the peat while it is still hot either at the roasting temperature or after a partial cooling, according to the degree of moisture of the peat and to the degree to which the drying or carbonizing process should be carried on. Hereby the grains of peat are for a short period brought into contact with the hot ore whereby the mechanically contained water immediately escapes as steam.

In the production of spongy iron it has been found very difficult to maintain a uniform heat in the different parts of the furnace employed, such a heat being of importance for obtaining a short period of reduction and a uniform product. Our invention therefore also comprises a method of facilitating the operation of such furnaces. This method will be described with reference to the accompanying drawing which shows a number of such furnaces in a cross-section. The furnaces 1, 2 ... are provided with inlet channels 4, 6 ... for the combustible gas and inlet channels 5, 7 ... for the air. Further they are provided with top channels 11, 12 ... which can be connected to a chimney, and bottom channels 8, 10 ... which communicate with a common channel 9. Receptacles 3 are capable of being introduced into each of the furnaces.

The method is the following:—After the receptacles 3 of the furnaces have been filled with the charge either while in place in the furnaces or outside the same and afterward introduced, gas and air are introduced through the channels 4 and 5 and are caused to burn in the furnace 1. The combustion gases pass down through the furnace and out through the ports 8 to the channels 9 from which they enter the furnace 2 through the ports 10, pass upward through the said furnace and then to the chimney through the channels 12. After the gases have passed the furnaces for some time in this direction their motion is reversed so that gas and air are introduced through channels 6 and 7 into the furnace 2 where the combustion takes place, then through the channels 9 in the opposite direction against before and upward through the furnace 1 and through the channels 11 to the chimney. It is obvious that by leading the combustion gases alternatively downward and upward through the furnace the temperature in the upper and lower parts of the latter are equalized. By causing gas and air to enter and burn around the upper portions of the receptacles the major part of the distillation and reduction gases rising through the receptacles can be utilized for the exterior heating.

When a voluminous reducing material such as peat is used, the charge must be packed tightly in order to give a sufficient specific weight to the spongy iron. This should be done in iron receptacles which are the only ones capable of withstanding a very tight packing. In ring furnaces which have hitherto normally been employed for the production of spongy iron, the air destined to burn the heating gases for the furnace chambers and the box piles is passed through the cooling chambers in order to be heated. This method may be employed when the charge is packed into receptacles of refractory stone but not when iron boxes are used because the latter on account of their red-hot condition would be oxidized by the air and soon fall into pieces. One inconvenience however also occurs in the use of receptacles of refractory stone viz. that the air partially oxidizes the red-hot spongy iron. The heating of the gas instead of the air in the way just mentioned has hitherto not been considered to be of any value because coal generator gas has been employed which has a high temperature already as it leaves the generator. In using peat generator gas the conditions will be different because such a gas has a very low temperature when leaving the generator. According to one modification of the present invention, therefore, when ring furnaces are used, and when peat generator gas is used as fuel, the chambers of such ring furnaces which serve to cool the charge in the known manner, are in the same time utilized for preheating the generator gas, instead of the air, as has been practised before. Hereby also the advantage is gained, that the receptacles containing spongy iron and the said iron itself, which are cooled and in the same time serve to preheat the generator gas, are not subjected to oxidation as would be the case if air was led around the said receptacles instead of gas.

Having now particularly described the nature of our invention and the manner of its operation, what we claim is:

1. A method of obtaining metals from powdered ore consisting in mixing the ore intimately with powdered peat, inclosing the mixture in receptacles and heating said receptacles externally by means of the combustion of gases to such a temperature and for such a time that the ore will be reduced to metal while the ore and the metal are still in a solid state and substantially at rest in the receptacles.

2. A method of obtaining metals from powdered ore consisting in mixing the ore intimately with powdered peat, inclosing the mixture in receptacles and heating said receptacles externally by means of the combustion of gases led alternately in both directions around the receptacles, the heating being carried on to such a temperature and for such a time that the ore will be reduced to metal while the ore and the metal are still in a solid state and substantially at rest in the receptacles.

In testimony whereof we have signed our names to this specification in the presence of two subscribing witnesses each.

PER ANDERSON.
ERIK E: son ODELSTIERNA.

Witnesses of Per Anderson:
F. LEGARBERG,
O. E. LEGARBERG.

Witnesses for Erik E: son Odelstierna:
BIEGER NORDFELDT,
A. SIMON.